(12) United States Patent  
Stenzel et al.

(10) Patent No.: US 9,197,051 B2  
(45) Date of Patent: Nov. 24, 2015

(54) ADJUSTABLE MOUNTING ASSEMBLY

(71) Applicant: GEOTEK, LLC, Stewartville, MN (US)

(72) Inventors: Christopher Alan Stenzel, Rochester, MN (US); Richard Franklin Clyatt, Grayson, GA (US); Harvey Eugene Flowers, Grand Meadow, MN (US); Brian Raymond Hornberg, Stewartville, MN (US); Steven Roger Volkman, Winona, MN (US); Bruce Frederick Blumentritt, Rochester, MN (US)

(73) Assignee: Geotek, LLC, Stewartville, MN (US)

( * ) Notice: Subject to any disclaimer, the term of this patent is extended or adjusted under 35 U.S.C. 154(b) by 6 days.

(21) Appl. No.: 14/160,902

(22) Filed: Jan. 22, 2014

(65) Prior Publication Data

US 2014/0203150 A1    Jul. 24, 2014

Related U.S. Application Data

(60) Provisional application No. 61/755,461, filed on Jan. 22, 2013.

(51) Int. Cl.
| | | |
|---|---|---|
| *A47F 5/00* | (2006.01) | |
| *H02G 7/05* | (2006.01) | |
| *E04H 12/24* | (2006.01) | |
| *H01Q 1/12* | (2006.01) | |
| *H02G 7/12* | (2006.01) | |

(52) U.S. Cl.
CPC ................. *H02G 7/05* (2013.01); *E04H 12/24* (2013.01); *H01Q 1/1242* (2013.01); *H02G 7/12* (2013.01); *Y10T 29/49716* (2015.01)

(58) Field of Classification Search
CPC ...... H02G 7/12; H02G 7/05; Y10T 29/49716; E04H 12/24; H01Q 1/1242
USPC .............. 248/70, 236, 295.11, 297.11, 354.1, 248/354.5, 688; 52/651.02, 695, 697; 174/45 R; 182/2.1, 108, 182, 184; 212/168, 278, 283; 414/680
See application file for complete search history.

(56) References Cited

U.S. PATENT DOCUMENTS

| | | | | |
|---|---|---|---|---|
| 2,906,379 | A | * | 9/1959 | Smalley .......................... 52/697 |
| 5,076,449 | A | * | 12/1991 | Clutter .......................... 212/283 |
| 6,043,795 | A | * | 3/2000 | Strieffler et al. .............. 343/890 |
| 6,971,212 | B1 | * | 12/2005 | Johnson et al. ............ 52/651.02 |

(Continued)

OTHER PUBLICATIONS

"Full-Scale Bending Tests of Transmission-Size Fiberglass Crossarm with Knee and Vee Brace Assemblies," prepared by EDM International, Inc., Fort Collins, CO, Jul. 2013, 17 pages.

(Continued)

*Primary Examiner* — Gwendolyn Baxter  
(74) *Attorney, Agent, or Firm* — Hamre, Schumann, Mueller & Larson, P.C.

(57) ABSTRACT

An adjustable mounting assembly for attaching an attachment end of a first beam member to a second beam member. The adjustable mounting assembly includes a first bracket attachable to the first beam member; a second bracket attachable to the second beam member; and a point of attachment where the first and second brackets are attached to each other. The adjustable mounting assembly is configured to allow a position of the first beam member to be adjusted relative to the second beam member.

15 Claims, 13 Drawing Sheets

(56) References Cited

U.S. PATENT DOCUMENTS

| | | | |
|---|---|---|---|
| 8,261,509 B2 * | 9/2012 | Harkin | 52/645 |
| 2003/0041553 A1 * | 3/2003 | Schauf et al. | 52/736.2 |

OTHER PUBLICATIONS

"Transmission & H-Frame Product Catalog," published by Geotek, Stewartville, MN, available as early as Jul. 18, 2013, 8 pages.

* cited by examiner

ADJUSTABLE MOUNTING ASSEMBLY

FIELD

This disclosure relates generally to utility line support systems, and particularly, but not by way of limitation, to adjustable mounting assemblies and methods for mounting support members in utility line support systems.

BACKGROUND

Utility poles can be used to support electrical power lines, telephone lines, cable TV lines, communication antennas and transmitters and the like. Crossarms are attached near the top of utility poles for positioning and supporting utility lines and other utility transmission members. For example, crossarms are used to support electrical power transmission lines and insulators. Crossarms can be attached to utility poles by various means, such as by a clamp, a gain fixture, or most often by a bolt running diametrically through both the cross-arm and the pole. In addition, bracing members can be used to enhance securement of crossarms to utility poles. In such circumstances, various mounting means, such as bolts and nuts, can be used to mount bracing members.

SUMMARY

Some embodiments of an adjustable mounting assembly for a utility line support system can be configured to attach a first support member, such as a bracing member, to a second support member, such as a crossarm, a utility pole, or the like. In such instances, the adjustable mounting assembly is configured to allow a distance between an attachment end of the first support member and the second support member to be adjusted.

In other embodiments, the adjustable mounting assembly is configured to allow the first support member such as a bracing member, to be positioned at a plurality of orientations relative to the second support member, such as a crossarm, a utility pole, or the like, thereby allowing an orientation of the first support member relative to the second support member to be adjusted.

Particular embodiments include an adjustable mounting assembly for attaching an attachment end of a first beam member to a second beam member. The adjustable mounting assembly includes a first bracket attachable to the first beam member; a second bracket attachable to the second beam member; and a point of attachment where the first and second brackets are attached to each other. The adjustable mounting assembly is configured to allow a position of the first beam member to be adjusted relative to the second beam member.

In some embodiments, a utility line support system comprises a support member; a bracing member having an attachment end attached to the support member; and an adjustable mounting assembly that attaches the attachment end of the bracing member to the support member. The adjustable mounting assembly comprises a first bracket attachable to the bracing member; a second bracket attachable to the support member; and a point of attachment where the first and second brackets are attached to each other. The adjustable mounting assembly is configured to allow a position of the bracing member to be adjusted relative to the support member.

Other embodiments may include a method of adjusting a position of a crossarm bracing member relative to a support member used in a utility line support system by adjusting an adjustable mounting assembly. The adjustable mounting assembly includes a first bracket, a second bracket and a point of attachment where the first and second brackets are attached to each other. The method includes adjusting a position of the first bracket relative to an attachment end of the bracing member by selecting one of a plurality of mounting holes defined in the first bracket for mounting with the attachment end of the bracing member; attaching the first bracket to the attachment end of the bracing member by aligning the selected mounting hole of the first bracket with a mounting hole defined in the attachment end of the bracing member; adjusting an orientation of the first bracket relative to the second bracket by pivoting the first bracket about the point of attachment; adjusting a position of the second bracket relative to the support member by selecting one of a plurality of mounting holes defined in the second bracket for mounting with the support member; and attaching the second bracket to the support member by aligning the selected mounting hole of the second bracket with a mounting hole defined in the support member.

These and other embodiments described herein may provide one or more of the following benefits. First, some embodiments of the adjustable mounting assembly can be used to adjust a distance between an attachment end of a bracing member and a support member. For example, the assembly may include a first bracket that includes a plurality of mounting holes. The first bracket can be attached to the attachment end of the bracing member at a plurality of alternative positions, where a distance between the attachment end of the bracing member and support member can be adjusted by selecting different mounting holes for the attachment. Second, some embodiments of the adjustable mounting assembly can be used to adjust an orientation of the first bracket relative to the second bracket, thereby allowing the orientation of the bracing member to be adjusted relative to the support member. For example, the first bracket can have a first coupling element, and the second bracket can have a second coupling element, where the first and second coupling elements can be coupled with each other at the point of attachment and the first bracket is pivotable about the point of attachment relative to the second bracket.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference symbols in the various drawings indicate like elements.

DETAILED DESCRIPTION

Figure 1:
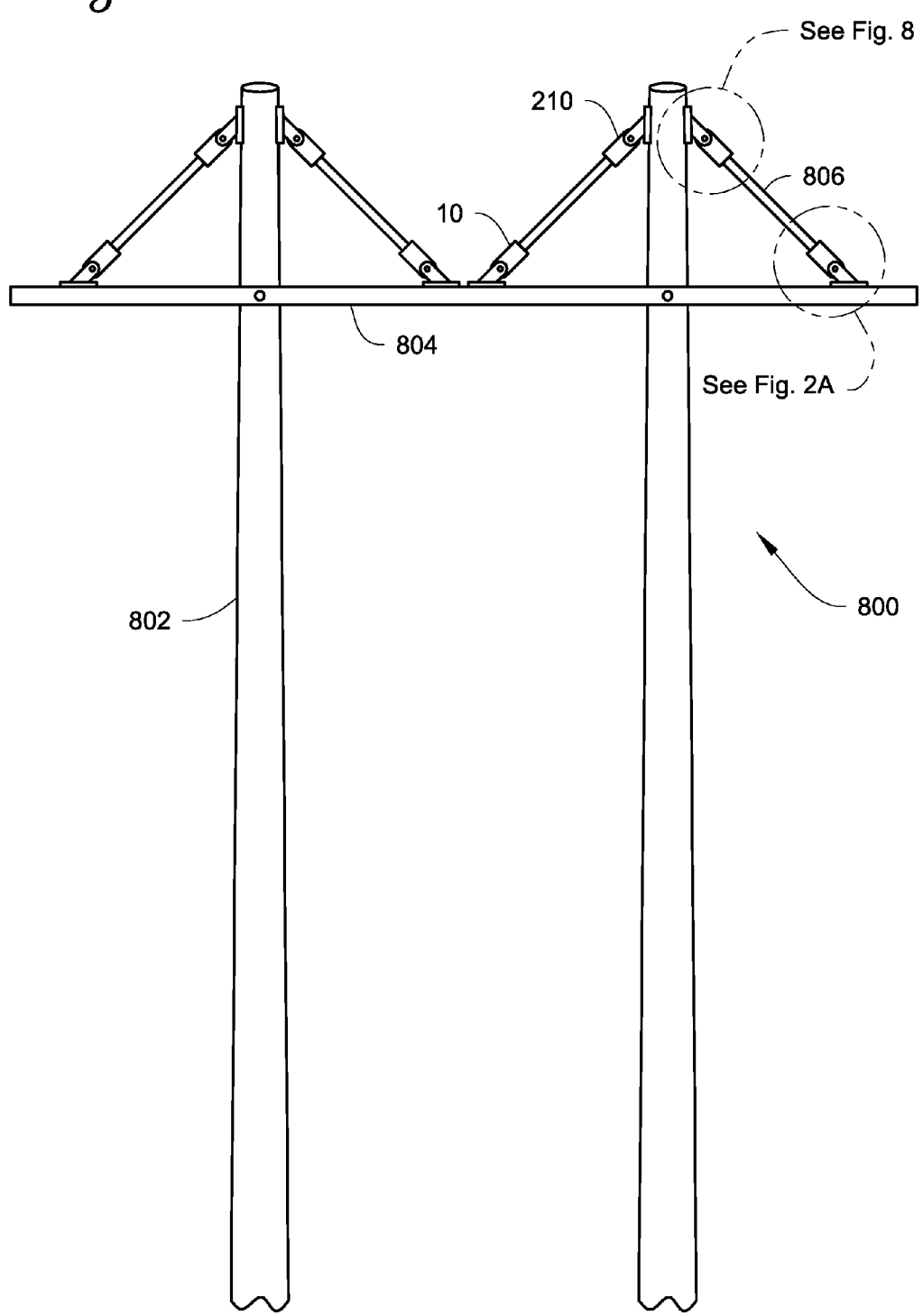
FIG. 1 illustrates a utility line support system that employs adjustable mounting assemblies of the present disclosure.

As used herein, the term "support member" refers to any load bearing member in buildings, constructions or machines, such as braces, crossarms, spacers, poles, etc., in utility line support systems; building braces such as pole building braces, steel shell building braces, etc.; braces for elevated structures, such as platforms, towers, etc., for strengthening and stiffening; load bearing members in light weight bridge structures; truss structures that require adjustments for stability and strength; load bearing members in mobile structures such as light weight military structures for field installation and use; load bearing members in power substation structures; braces for deck, including local bracing for an existing deck, reinforcing a particular location on a deck; added braces to a structure for repair/maintenance of existing structures.

Some embodiments of an adjustable mounting assembly for a utility line support system can be configured to attach a first support member, such as a bracing member, to a second support member, such as a crossarm, a utility pole, or the like. In such instances, the adjustable mounting assembly is configured to allow a distance between an attachment end of the first support member and the second support member to be adjusted.

In other embodiments, the adjustable mounting assembly is configured to allow the first support member such as a bracing member, to be positioned at a plurality of orientations relative to the second support member, such as a crossarm, a utility pole, or the like, thereby allowing an orientation of the first support member relative to the second support member to be adjusted.

It is to be understood that the use of the adjustable mounting assembly is not limited to mounting a support member in utility line support systems. The adjustable mounting assembly can be used to adjust attachments or connections in various buildings, constructions or machines where stiffness or strength of a support member needs to be maintained. For ease of the description, the adjustable mounting assembly is described for attaching a bracing member to a support member such as a crossarm, a pole, a spacer, or the like, of a utility line support system. However, it is to be understood that the adjustable mounting assembly can also be used in other industries.

Referring to FIGS. 1, 2A-C, and 3-4, in some embodiments, an adjustable mounting assembly 10 can be used in a utility line support system 800 having a single crossarm construction. The utility line support system 800 includes various support members such as a pole 802, a single crossarm 804 mounted on the pole 802, and a bracing member 806 for stiffening and stabilizing the crossarm 804.

The adjustable mounting assembly 10 is configured to allow an upper end 812 of the bracing member 806 to be attached to a side face of another support member, such as a pole 802, and the lower end 810 of the bracing member 806 to be attached to a top or bottom face of the crossarm 804. The adjustable mounting assembly 10 is configured to allow a distance between the lower end 810 of the bracing member 806 and the crossarm 804 to be adjusted from d to d' (referring to FIGS. 2A-B), and allow an angle between the bracing member 806 and an axial axis of the crossarm 804 to be adjusted from θ to θ (referring to FIGS. 2A and 2C). As a result, the length or the orientation of the bracing member 806 can be adjusted to allow the bracing member 806 to fit between crossarms and poles that have various distances.

As shown in FIGS. 2A-C and 3-4, in some embodiments, the adjustable mounting assembly 10 includes an extendable bracket 12, an anchoring bracket 14 and a fastening plate 16. The extendable bracket 12 and the anchoring bracket 14 are attached to each other at a point of attachment 18. The fastening plate 16 can be used to cooperate with the extendable bracket 12 for fastening the extendable bracket 12 to the bracing member 806.

Figure 5:
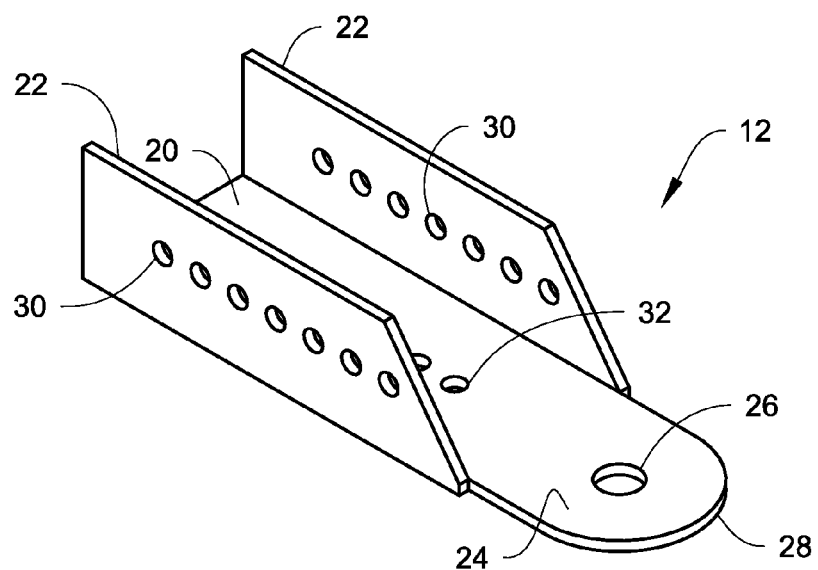
FIG. 5 is a perspective view of an extendable bracket of the adjustable mounting assembly of FIG. 2A.

Referring now to FIG. 5, the extendable bracket 12 includes a base panel 20 and two opposing side panels 22 with a U-shaped cross section for receiving an attachment end of a first support member, e.g., the lower end 810 of the bracing member 806 in the embodiment depicted in FIGS. 2A-C and 3-4. However, it is to be understood that the cross section of the extendable bracket 12 can be an open or closed square shape, rectangular shape, circular shape, oval shape, various polygonal shapes, etc., depending on the shape of the attachment end of the first support member to which it is attached to. Extending generally from the base panel 20 at one end of the extendable bracket 12 is a first coupling element 24 having a fastener hole 26 defined therein for receipt of a fastener. In the depicted embodiment, the first coupling element 24 is a flat plate having a flat semicircular free end 28 located at one end of extendable bracket 12. However, other shapes can be employed as long as the fastener hole is spaced away from the side panels 22 in an axial direction to allow for either a front or rear side of the first coupling element to be positioned next to a coupling element of the anchoring bracket 14. This, in effect, allows the extendable bracket 12 to be reserved and used on either a front or rear side of the anchoring bracket 14 for attachment.

A plurality of side mounting holes 30 are defined in each of the two side panels 22 to allow fasteners like bolts to extend transversely between the side panels 22. Correspondingly, a plurality of base mounting holes 32 are defined in the base panel 20. The corresponding side mounting holes 30 and the base mounting holes 32 are offset in an axial direction such that when fasteners 34 (referring to FIG. 4) like bolts extend transversely through the side mounting holes 30 defined in both side panels 22, and fasteners 36 like bolts extend transversely through the base mounting holes 32 defined in the base panels 20, the fasteners 34 and the fasteners 36 (referring to FIGS. 2A-C) are not crossing each other. In the depicted embodiment as shown in FIGS. 2A-C and 3-5, seven side mounting holes 30 are defined in each of the side panels 22, and seven offset base mounting holes 32 are defined in the base panel 20. However, it is to be understood, the number and location of the side mounting holes 30 or the base mounting holes 32 can be any even number or odd number as long as it allows the position of the extendable bracket 12 to be adjusted relative to the attachment end of the first support member, e.g., the lower end 810 of the bracing member 806. It is also to be understood that although the numbers of the side mounting holes 30 and the base mounting holes 32 are equal to each other in the embodiment depicted in FIGS. 1, 2A-C and 3-5, the numbers of the side mounting holes 30 and the base mounting holes 32 can be different in alternative embodiments.

Figure 2A:
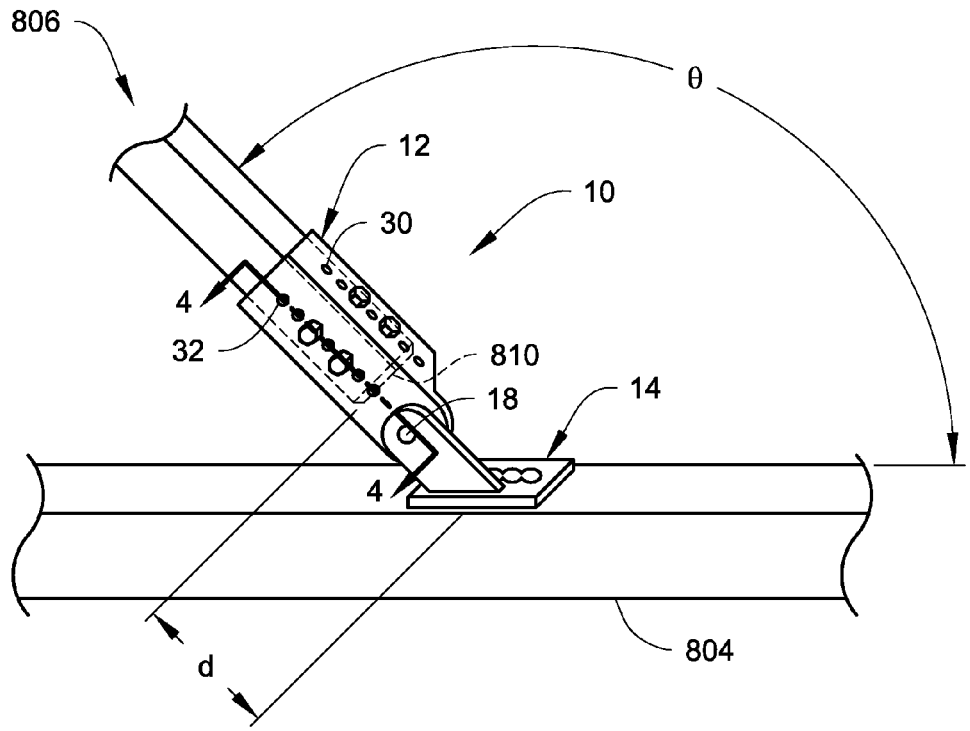
FIG. 2A is an enlarged view of an adjustable mounting assembly in FIG. 1, which is employed to attach a bracing member to a crossarm.

Referring to FIGS. 2A-C and 3-4, when in use, the side mounting holes 30 and the base mounting holes 32 cooperate with pre-drilled transverse holes defined in the bracing member 806 to allow a fastener like bolt to extend through. Referring to FIG. 2A, two transverse holes defined in two opposing sides of the end 810 of the bracing member 806 cooperate with the third and fifth base mounting holes 32 defined in the base panel 20, respectively. The fastening plate 16 can be placed on a side of the lower end 810 of the bracing member 806 opposing the base panel 20 of the extendable bracket 12 to clamp and squeeze the lower end 810. In some embodiments, the fastening plate 16 acts as a washer to help distribute load imposed by fasteners such as bolts. Fasteners 36 are extended through the base mounting holes 32 defined in the base panel 20 of the extendable bracket 12 and mounting holes 60 defined in the fastening plate 16 to fasten the extendable bracket 12 and the fastening plate 16 to the bracing member 806. Likewise, two transverse holes defined in the other two opposing sides of the lower end 810 of the bracing member 806 cooperate with the third and fifth side mounting holes 30 defined in the side panels 22, respectively. Bolts 34 and nuts are used to fasten the side panels of the extendable bracket 12 to the bracing member 806.

Figure 2B:
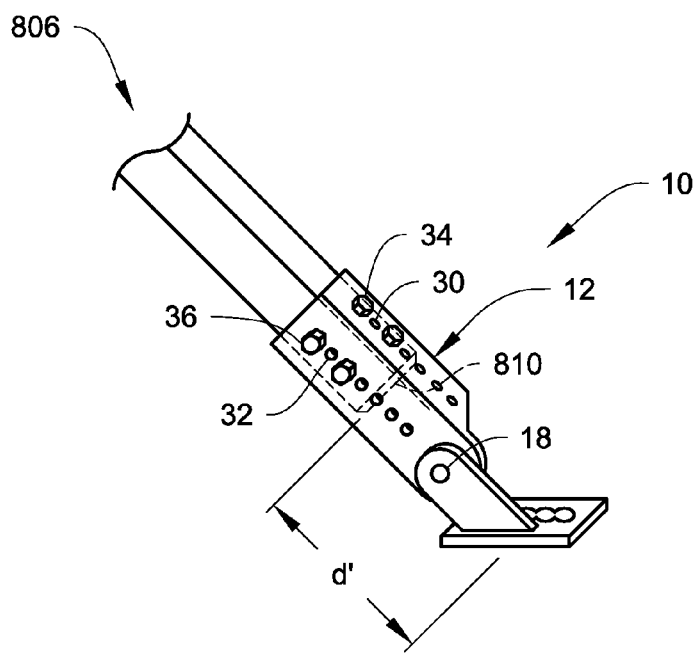
FIG. 2B illustrates the adjustable mounting assembly of FIG. 2A with a lower end of the bracing member being mounted further away from the support member.

In case when a longer bracing member 806 is needed, as shown in FIG. 2B, the two transverse holes defined in two opposing sides of the lower end 810 of the bracing member 806 cooperate with the first and third base mounting holes 32 defined in the base panel 20, respectively. The fastening plate 16 can be placed on a side of the bracing member 806 opposing the base panel 20 of the extendable bracket 12. The fastener 36 are extended through the base mounting holes 32 defined in the base panel 20 of the extendable bracket 12 and mounting holes 60 defined in the fastening plate 16 to fasten the extendable bracket 12 and the fastening plate 16 to the bracing member 806. Likewise, the two transverse holes defined in the other two opposing sides of the lower end 810 of the bracing member 806 cooperate with the first and third side mounting holes 30 defined in the side panels 22, respectively. Bolts 34 and nuts are used to fasten the side panels 22 of the extendable bracket 12 to the bracing member 806.

In the depicted embodiments as shown in FIGS. 2A-C and 3-5, the seven side mounting holes 30, and the seven base mounting holes 32 defined in each of the side panels 22 and the base panel 20, respectively, allow the extendable bracket 12 to be positioned at five alternative positions relative to the lower end 810 of the bracing member 806. As a result, a distance between the lower end 810 of the bracing member 806 and the crossarm 804 can be adjusted from d as in FIG. 2A to d' as in FIG. 2B in an axial direction of the bracing member 806. In some embodiments, a difference between d and d' can be up to half of the length of the bracing member and preferably about 0-5 inches. In some embodiments, when the extendable bracket 12 is mounted on both ends 810, 812 of the bracing member 806, each end of the bracing member 806 can be extended for about 5 inches. As a result, the length of the bracing member 806 can be adjusted for up to about 10 inches.

Figure 6A:
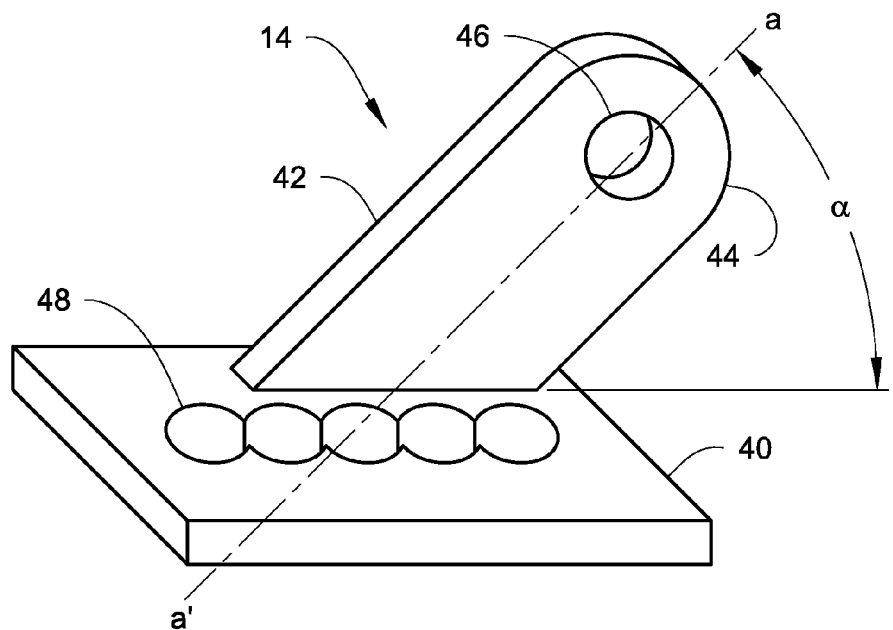
FIG. 6A is a perspective view of an anchoring bracket of the adjustable mounting assembly of FIG. 2A.

Referring now to FIGS. 2A-C, 3 and 6A, the anchoring bracket 14 includes a plate 40 and a second coupling element 42 formed in a plane perpendicular to the plate 40 and has an axis a-a' that is inclined at an angle a with respect to the plate 40. In the depicted embodiment as shown in FIG. 6A, the second coupling element 42 has a flat semicircular free end 44 and a fastener hole 46 adjacent the free end 44. However, the angle α and the shape and length of the second coupling element 42 can vary as long as the second coupling element can cooperate with the first coupling element 24 at the point of attachment 18. In some embodiments, the angle a can be up to a 90-degree angle. When in use, the fastener hole 46 is aligned with the fastener hole 26 formed in the first coupling element 24 of the extendable bracket 12. A fastener 47 like a bolt can be extended through the fastener holes 26, 46 to couple the extendable bracket 12 and the anchoring bracket 14.

Figure 2C:
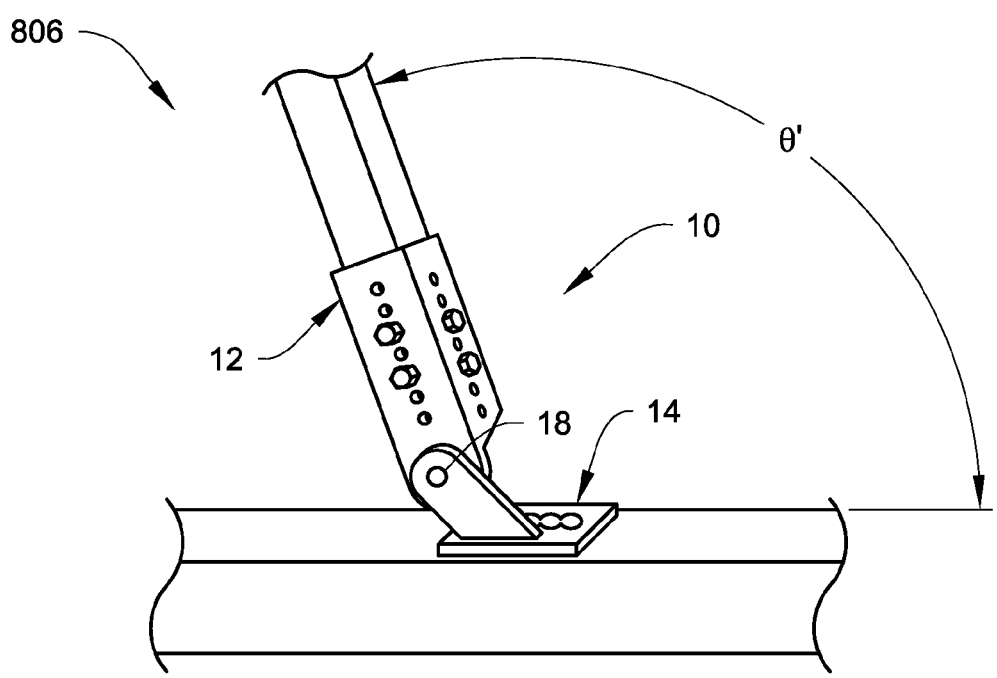
FIG. 2C illustrates the adjustable mounting assembly of FIG. 2A with the bracing member being oriented at a smaller angle relative to the support member.
Figure 3:
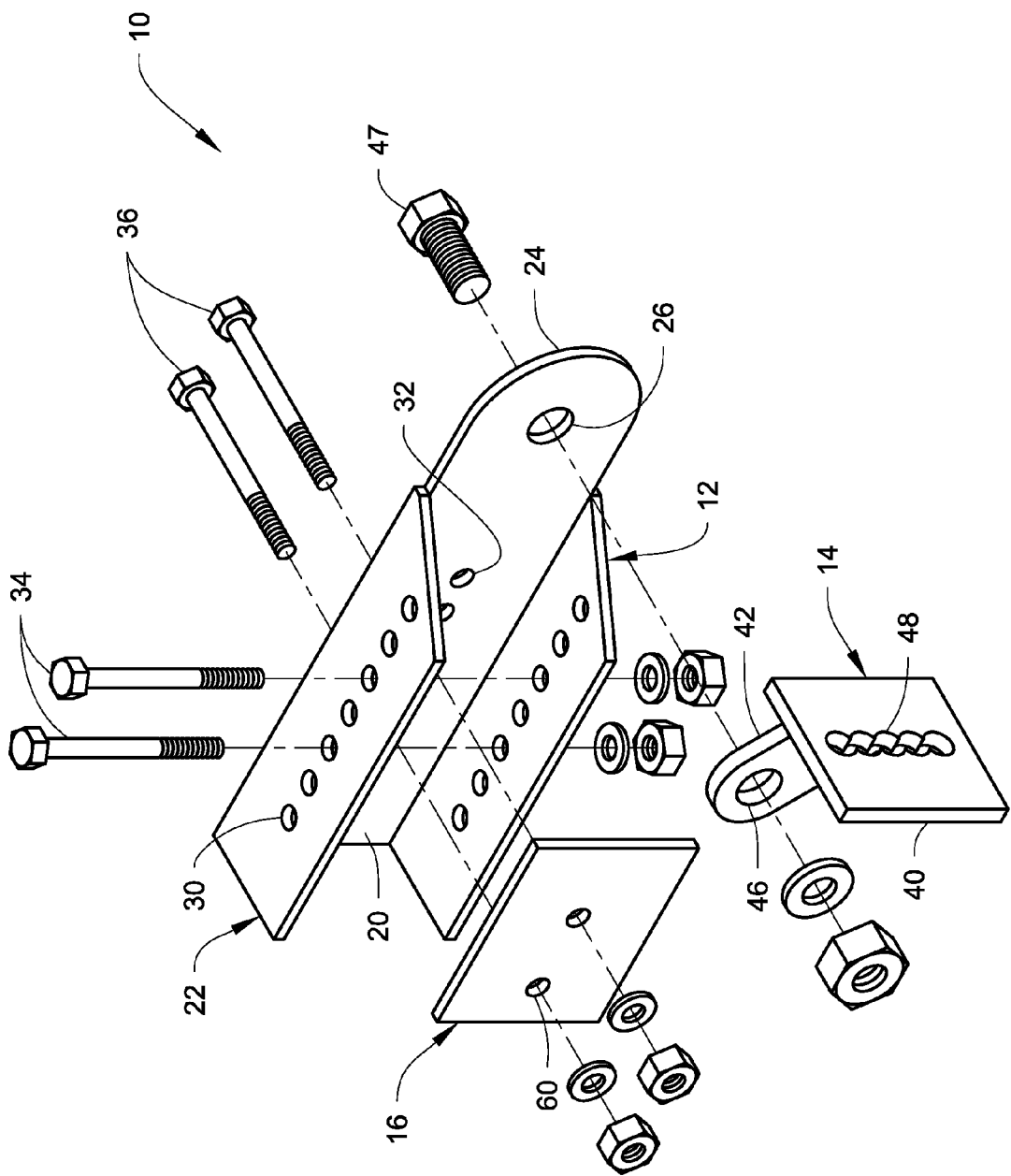
FIG. 3 illustrates an exploded view of the adjustable mounting assembly employed in FIG. 2A.
Figure 4:
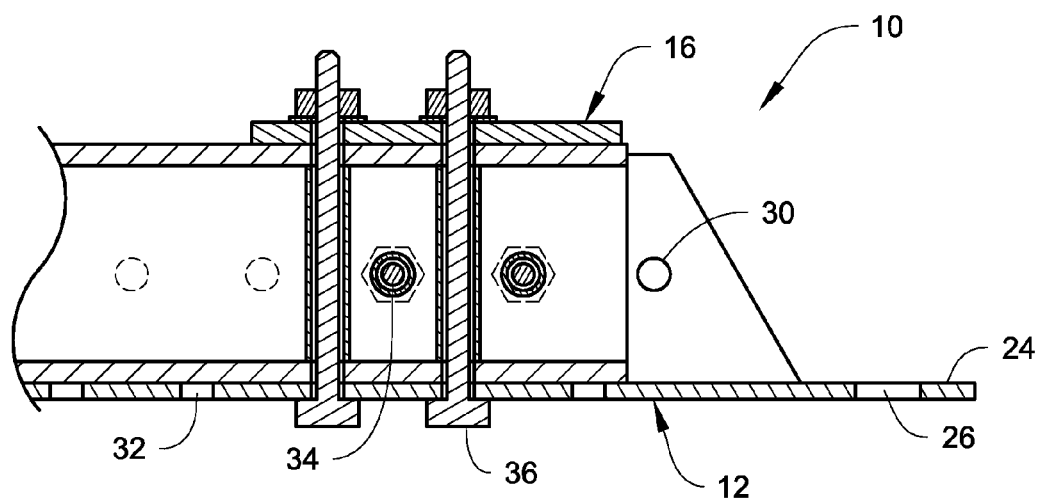
FIG. 4 illustrates a cross sectional view of part of the adjustable mounting assembly taken along line IV-IV in FIG. 1.

The plate 40 can be configured to include more than one mounting hole 48 for mounting the anchoring bracket 14 to the crossarm 804. In the depicted embodiments as shown in FIG. 3, five mounting holes 48 are defined in the plate 40. This allows the anchoring bracket 14 to be positioned at five alternative positions relative to the crossarm 804. For example, as shown in FIG. 2A, a third mounting hole 48 is used to mount the anchoring bracket 14 to the crossarm 804, while in FIG. 2C, a fifth mounting hole 48 is used. This allows a lateral adjustment of the anchoring bracket 14 for a distance that equals the distance between the first and the fifth mounting holes 48. Moreover, when the upper end 812 is attached to the pole 802, an angle formed between the bracing member 806 and the plate 40 of the anchoring bracket 14 (which is generally parallel to the upper surface or lower surface of the crossarm 804) can be adjusted from θ as shown in FIG. 2A to θ' as shown in FIG. 2C. In some embodiments, the angle θ can be adjusted in a range of 0-120 degrees, and preferably 30-60 degrees. In some other embodiments, the angle θ can be 45 degrees. It is to be understood that the shape of the plate 40 and the number and location of the mounting holes 48 can vary as desired. It is also to be understood that the mounting holes 48 can be configured to be discrete holes or to have a sawtooth pattern as shown in FIG. 6A, or combination thereof.

It is to be understood that bolt and nut assemblies are described as fasteners in this disclosure, however, other fasteners, such as screws, nails, rivets, may be used for mounting the bracing member 806 to the crossarm 804 by the adjustable mounting assemblies 10.

Figure 6B:
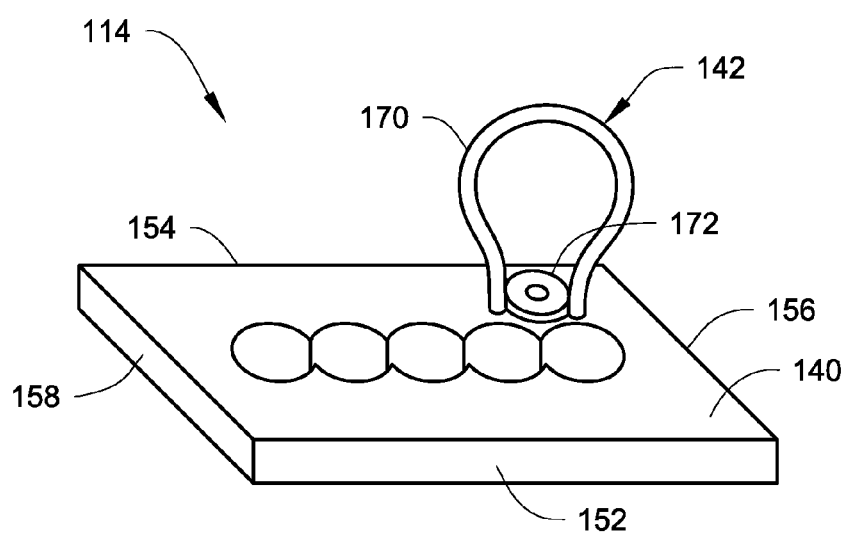
FIG. 6B is a perspective view of a further embodiment of the anchoring bracket.

Referring now to FIG. 6B, in some embodiments, an anchoring bracket 114 includes a plate 140 and a second coupling element 142. The plate 140 has two opposing end edges 156 and 158, and two side edges 152 and 154 extending between the end edges 156 and 158. The second coupling element 142 includes a coupling ring 170 and an attachment element 172 for attaching the coupling ring 170.

It is to be understood that the elements of the adjustable mounting assembly can take other forms as long as the assembly allows the position of the bracing member 806 relative to the crossarm 804 to be adjusted.

In some embodiments, the extendable bracket, the anchoring bracket and the fastening plate are made of metal, such as various specialty alloys, steel, etc., to allow the adjustable mounting assembly to have adequate strength and stiffness. However, it is to be understood that the components of the adjustable mounting assembly can be made of other materials suitable for its particular application. In one embodiment, the extendable bracket, the anchoring bracket and the fastening plate are made of galvanized structural steel.

In some embodiments, a thickness of the extendable bracket, anchoring bracket, and the fastening plate can be about ¼ inch, about 5/16 inch or about ⅜ inch. Greater thicknesses can be used for heavier duty applications.

It is to be understood that the adjustable assembly can be used to mount support members that are made of various materials, such as fiberglass composite materials, wood, concrete, metal such as steel, etc.

When in use, the adjustable mounting assembly 10 can be used to adjust a position of the bracing member 806 relative to the crossarm 804. Referring back to FIG. 2A-C, the position of the extendable bracket 12 can be adjusted relative to the lower end 810 of the bracing member 806 by selecting appropriate side mounting holes 30 and base mounting holes 32 defined in the extendable bracket 12 for mounting with the lower end 810 of the bracing member 806. The extendable bracket 12 is then attached to the lower end 810 of the bracing member 806 by aligning the selected mounting hole 30, 32 with a mounting hole defined in the lower end 810 of the bracing member 806. An orientation of the extendable bracket 12 can be adjusted relative to the anchoring bracket 14 by pivoting the extendable bracket 12 about the point of attachment 18. A position of the anchoring bracket 14 can also be adjusted relative to the crossarm 804 by selecting one of a plurality of mounting holes 48 defined in the anchoring bracket 14 for mounting with the crossarm 804. The anchoring bracket 14 is then attached to the crossarm 804 by aligning the selected mounting hole 48 with a mounting hole defined in the crossarm 804.

Figure 7:
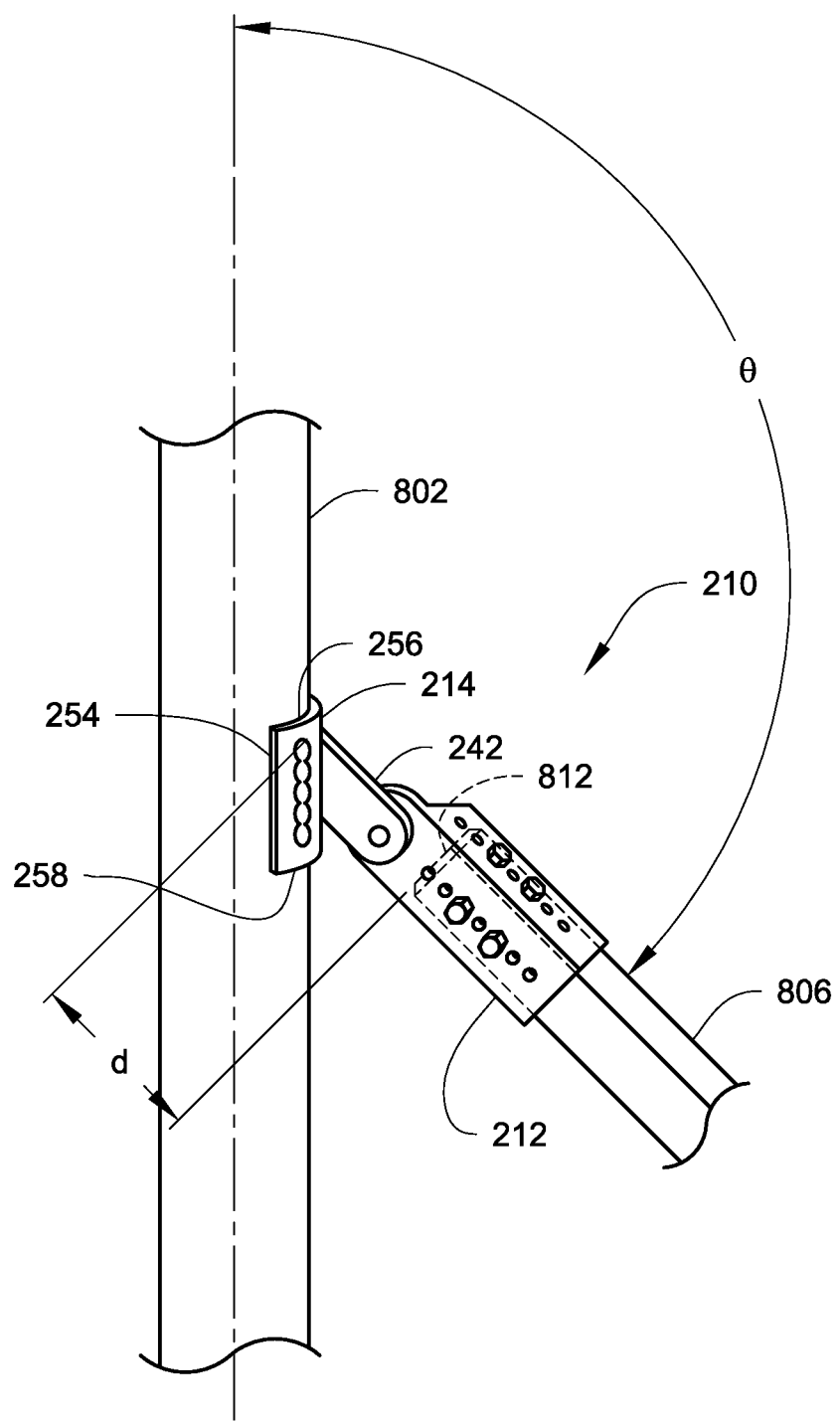
FIG. 7 is an enlarged view of another adjustable mounting assembly in FIG. 1, which is employed to attach a bracing member to a utility pole.
Figure 8:
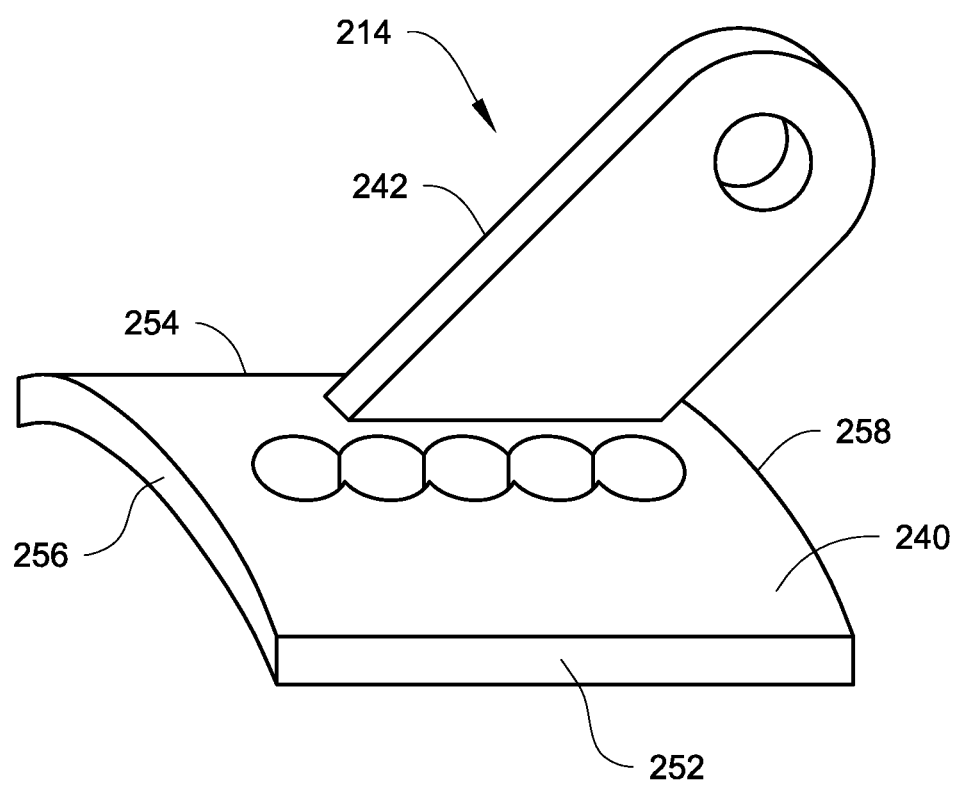
FIG. 8 is a perspective view of another embodiment of the anchoring bracket.

Referring now to FIGS. 7 and 8, an adjustable mounting assembly 210 (as shown in FIG. 1) is employed to attach the bracing member 806 to the pole 802. The adjustable mounting assembly 210 includes an extendable bracket 212 attached to the upper end 812 of the bracing member 806, an anchoring bracket 214 attached to the pole 802 and a fastening plate (not shown). In this depicted embodiment, the anchoring bracket 214 includes a plate 240 and a second coupling element 242. The plate 240 has two opposing end edges 256 and 258, and two side edges 252 and 254 extending between the end edges 256 and 258. As shown in the embodiment depicted in FIGS. 7 and 8, the side edges 252 and 254 can be constructed to curve away from the coupling element 242 to conform generally to the curvature of the pole 802 to which the anchoring bracket 214 is attached and allow the anchoring bracket 214 to be attached more securely to the pole 802.

Like the adjustable mounting assembly 10 depicted in FIGS. 2A-C, the adjustable mounting assembly 210 is configured to allow a distance d between the upper end 812 of the bracing member 806 and the pole 802 to be adjusted, and allow an angle θ between the bracing member 806 and an axial axis of the pole 802 to be adjusted.

Figure 9:
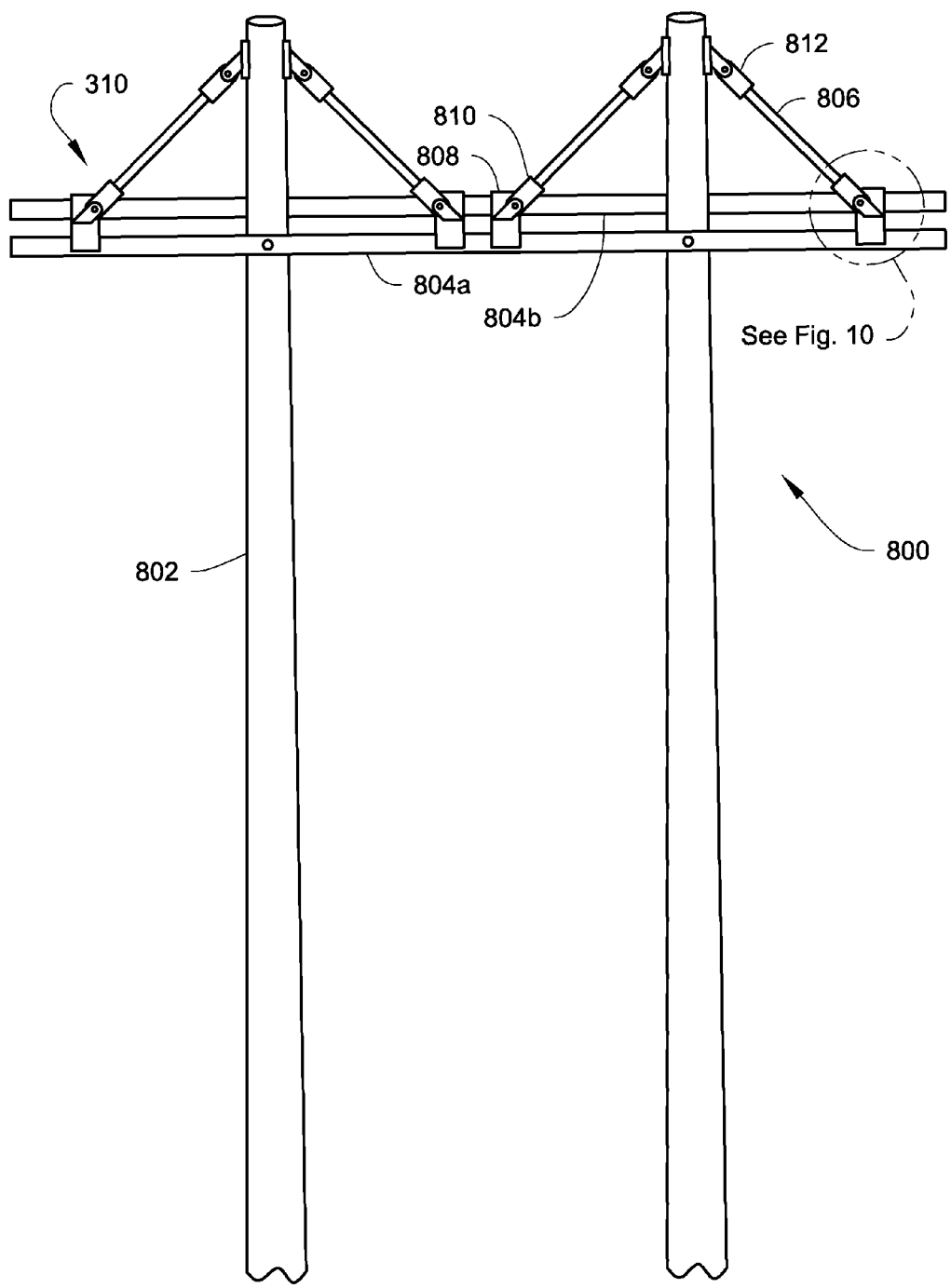
FIG. 9 illustrates another utility line support system that employs adjustable mounting assemblies of the present disclosure.
Figure 10:
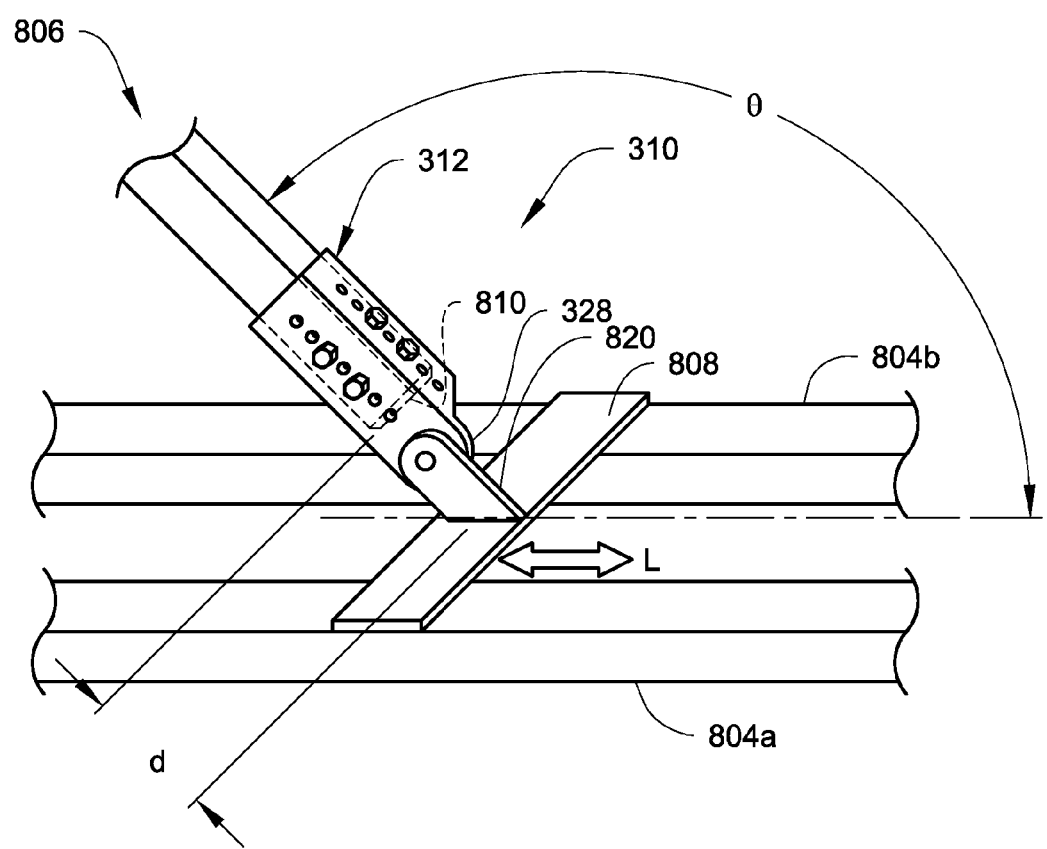
FIG. 10 is an enlarged view of an adjustable mounting assembly in FIG. 9.

Referring now to FIGS. 9 and 10, in some embodiments, an adjustable mounting assembly 310 can be used in a utility line support system 800 having a double crossarm construction. The utility line support system 800 includes various support members such as a pole 802, crossarms 804a, 804b mounted on the pole 802, spacers 808 securing the crossarms 804a, 804b to each other and a bracing member 806 for stiffening and stabilizing the crossarms 804a, 804b.

The adjustable mounting assembly 310 is configured to allow a lower end 810 of the bracing member 806 to be attached to a spacer 808 which secures the double crossarms 804a, 804b. The adjustable mounting assembly 310 includes an extendable bracket 312 attached to the lower end 810 of the bracing member 806 and a fastening plate (not shown), but does not have an anchoring bracket. As shown in FIG. 10, the extendable bracket 312 is coupled to a coupling member 820 formed on the spacer 808, instead of being coupled to an anchoring bracket. As a result, a free end 328 of the extendable bracket 312 is substantially fixed. The free end 328 is not allowed to be adjusted laterally along the two-head arrow L.

In this embodiment depicted in FIGS. 9 and 10, the adjustable mounting assembly 310 is configured to allow a distance d between the lower end 810 of the bracing member 806 and the spacer 808 to be adjusted, and allow an angle θ between the bracing member 806 and a plane defined by the spacer 808 to be adjusted. The adjustability of θ is less than that of the embodiment depicted in FIGS. 2A-C, because the free end 328 of the extendable bracket 312 is not allowed to be adjusted laterally along the two-head arrow L.

Figure 11:
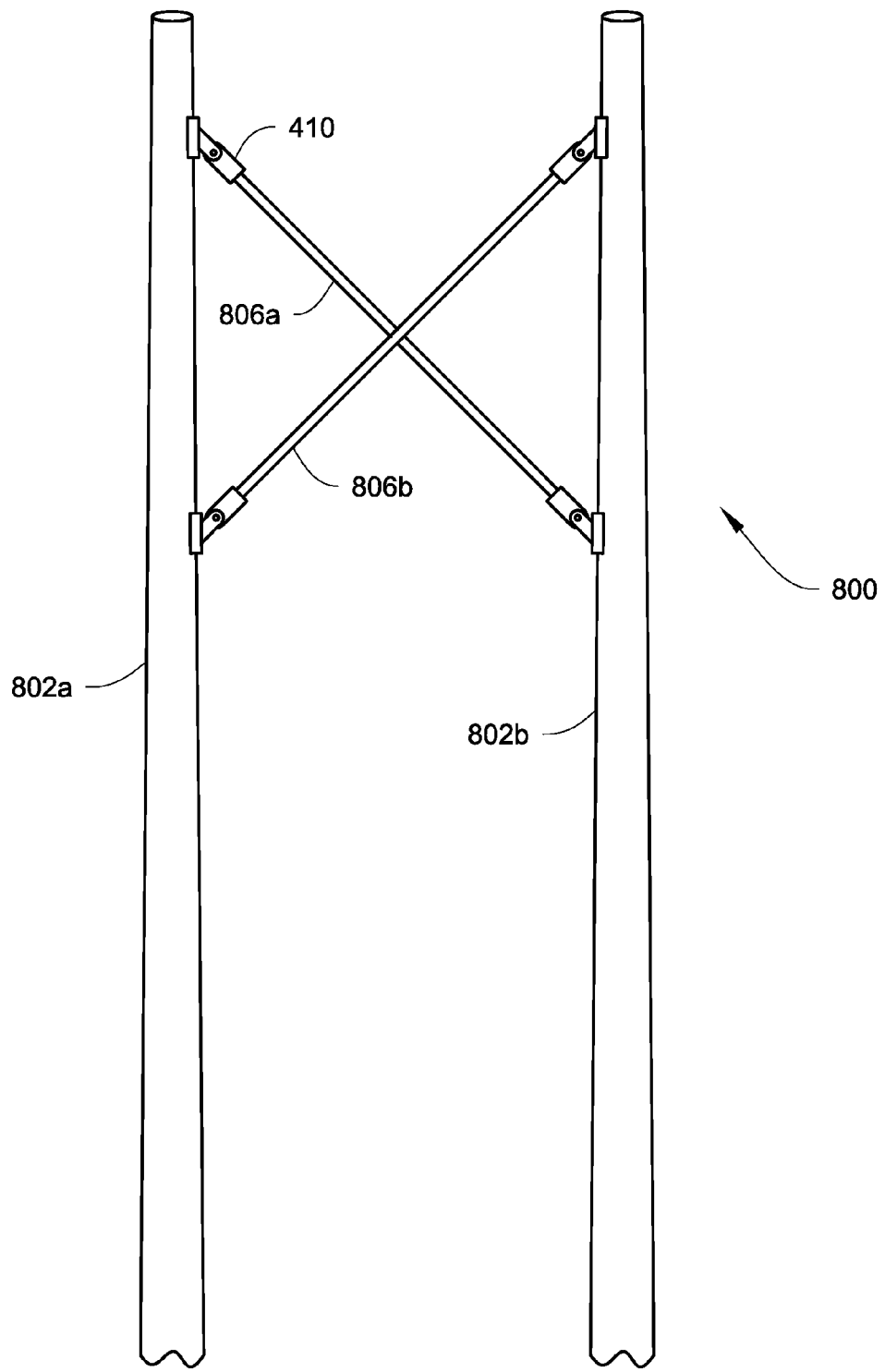
FIG. 11 illustrates a further utility line support system that employs adjustable mounting assemblies of the present disclosure.

Referring now to FIG. 11, in some embodiments, an adjustable mounting assembly 410 can be used in a utility line support system 800 having an X-brace construction. The utility line support system 800 includes various support members such as poles 802a, 802b and bracing members 806a, 806b for stiffening and stabilizing the poles 802a, 802b. The adjustable mounting assembly 410 in FIG. 11 can have a configuration similar to the adjustable mounting assembly 210 depicted in FIG. 8. However, it is to be understood, the adjustable mounting assembly 410 can have various other configurations as desired.

Figure 12:
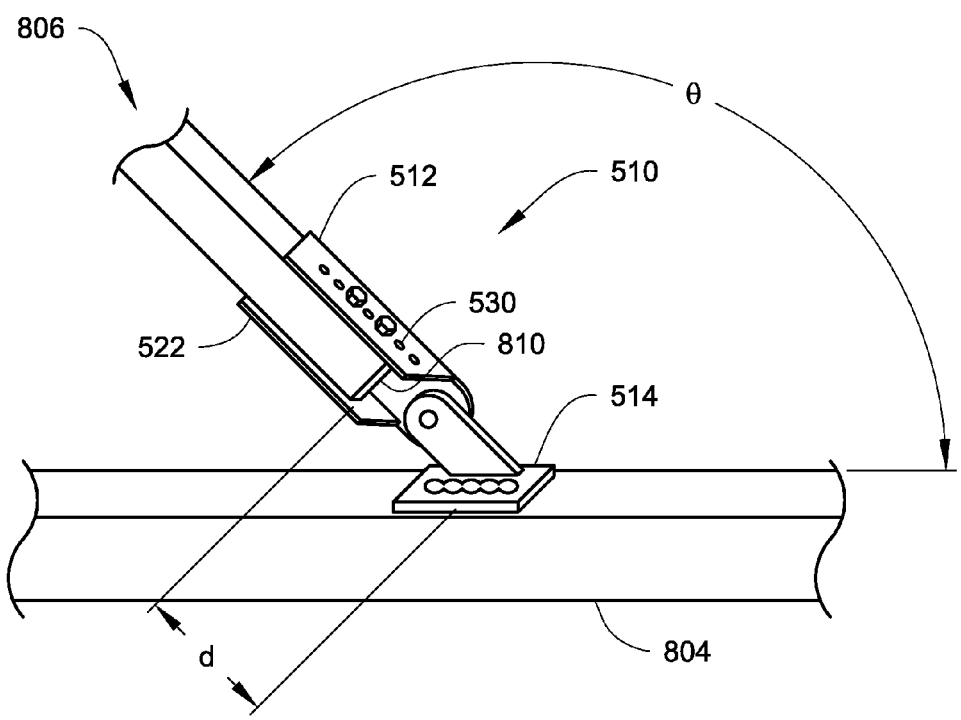
FIG. 12 is a perspective view of a further embodiment of the adjustable mounting assembly.

Referring now to FIG. 12, in some embodiments, an adjustable mounting assembly 510 includes an extendable bracket 512 attached to a lower end 810 of a bracing member 806 and an anchoring bracket 514 attached to a crossarm 804, but does not include a fastening plate. The extendable bracket 512 is mounted to the lower end 810 of the bracing member 806 by extending bolts through mounting holes 530 defined in side panels 522 and a mounting hole defined in the bracing member 806.

In this embodiment depicted in FIG. 12, the adjustable mounting assembly 510 is configured to allow a distance d between the lower end 810 of the bracing member 806 and the crossarm 804 to be adjusted, and allow an angle θ between the bracing member 806 and an axis of the crossarm 804 to be adjusted.

Figure 13:
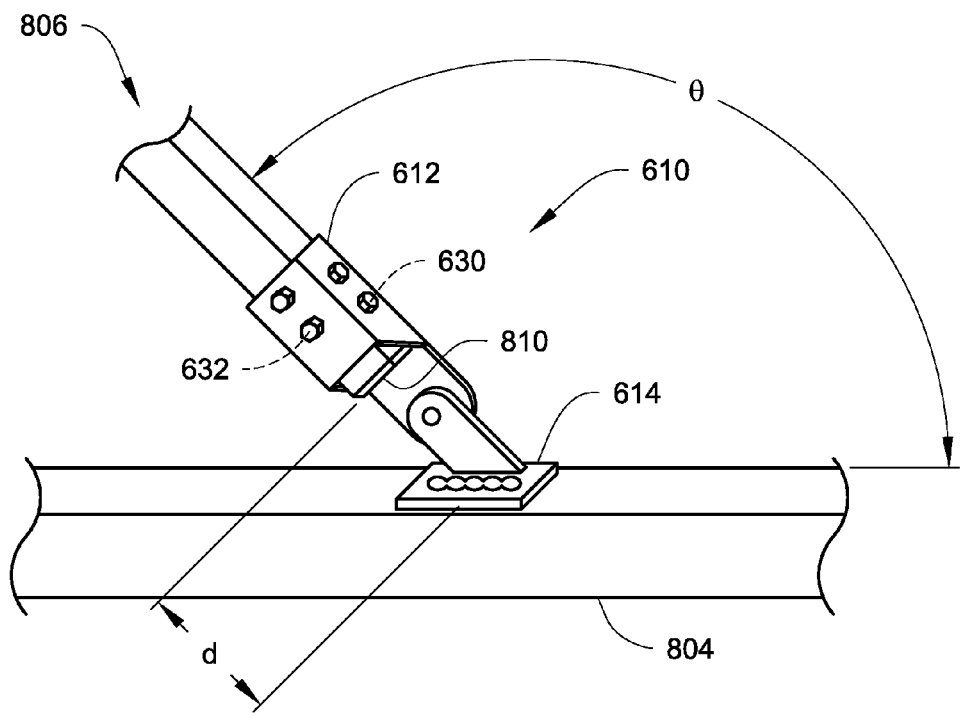
FIG. 13 is a perspective view of a still further embodiment of the adjustable mounting assembly.

Referring to FIG. 13, in some embodiments, an adjustable mounting assembly 610 includes an extendable bracket 612 attached to and encloses a lower end 810 of a bracing member 806 and an anchoring bracket 614 attached to a crossarm 804. The adjustable mounting assembly 610 does not have a fastening plate.

In this embodiment depicted in FIG. 13, the adjustable mounting assembly 610 can be configured to allow a distance d between the lower end 810 of the bracing member 806 and the crossarm 804 to be adjusted, and allow an angle θ between the bracing member 806 and an axis of the crossarm 804 to be adjusted. The adjustability of d is less than that of the embodiment depicted in FIGS. 2A-C, because fewer mounting holes 630, 632 are employed. If all the mounting holes 630, 632 have to be employed when the adjustable mounting assembly 610 is in use, the d will not be adjustable.

Figure 14:
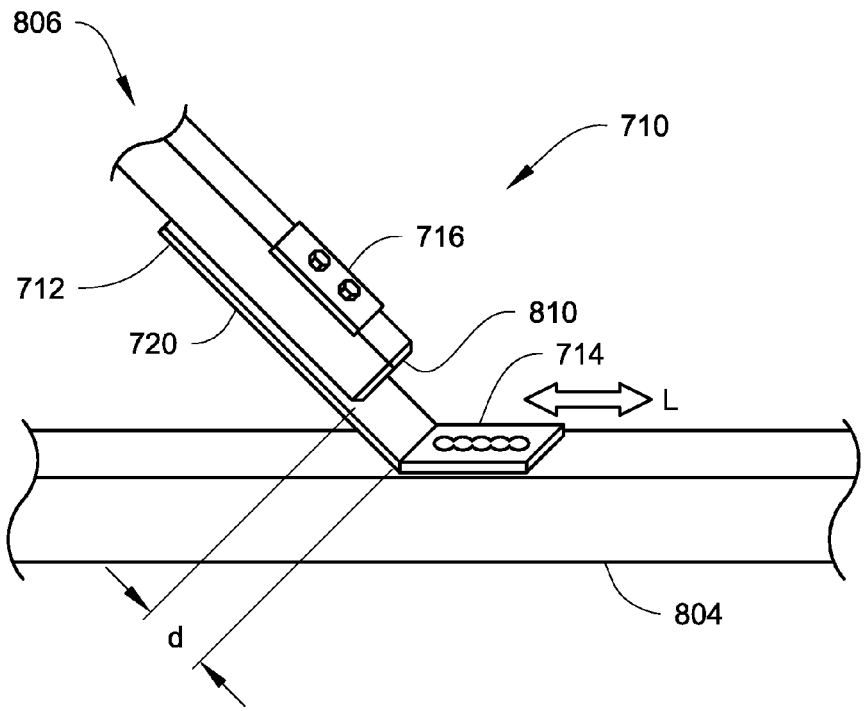
FIG. 14 is a perspective view of a yet further embodiment of the adjustable mounting assembly.

Referring to FIG. 14, in some embodiments, an adjustable mounting assembly 710 includes an extendable bracket 712 attached to a lower end 810 of a bracing member 806, an anchoring bracket 714 attached to a crossarm 804 and a fastening plate 716, with the extendable bracket 712 being formed integral with the anchoring bracket 714. In the embodiment as depicted in FIG. 14, the extendable bracket 712 only includes a base panel 720 but does not include side panels.

In this embodiment depicted in FIG. 14, the adjustable mounting assembly 710 is configured to allow a distance d between the lower end 810 of the bracing member 806 and the crossarm 804 to be adjusted. The sawtooth pattern defined in the anchoring bracket 714 allows the position of the adjustable mounting assembly 710 to be adjusted laterally along the two-head arrow L.

Figure 15:
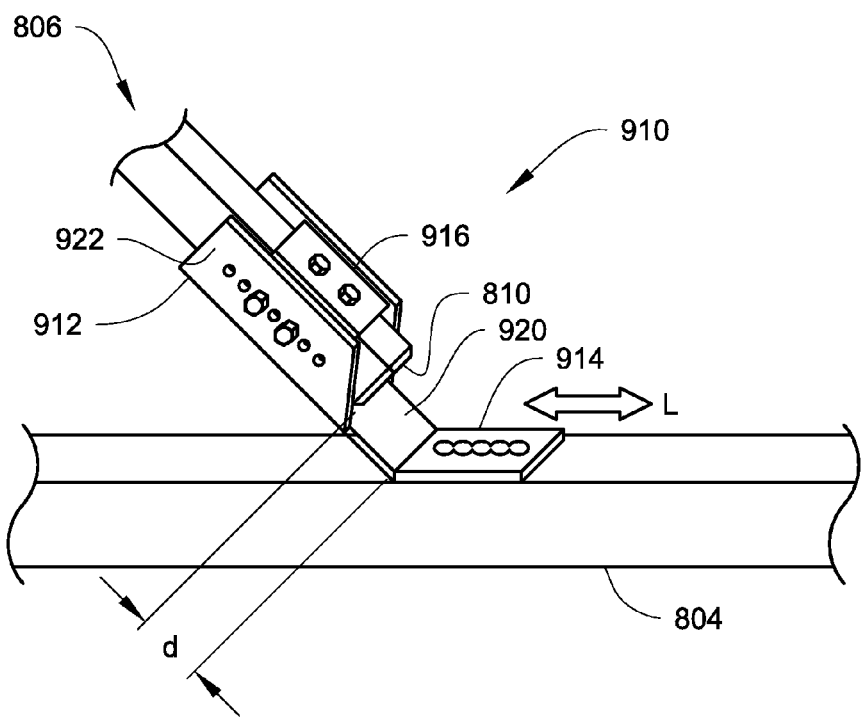
FIG. 15 is a perspective view of an even further embodiment of the adjustable mounting assembly.

Referring to FIG. 15, in some embodiments, an adjustable mounting assembly 910 includes an extendable bracket 912 attached to a lower end 810 of a bracing member 806, an anchoring bracket 914 attached to a crossarm 804 and a fastening plate 916, with the extendable bracket 912 being formed integral with the anchoring bracket 914. In the embodiment as depicted in FIG. 15, the extendable bracket 912 includes a base panel 920 and two opposing side panels 922.

In this embodiment depicted in FIG. 15, the adjustable mounting assembly 910 is configured to allow a distance d between the lower end 810 of the bracing member 806 and the crossarm 804 to be adjusted. The sawtooth pattern defined in the anchoring bracket 914 allows the position of the adjustable mounting assembly 910 to be adjusted laterally along the two-head arrow L.

A number of embodiments of the invention have been described. Nevertheless, it will be understood that various modifications may be made without departing from the spirit and scope of the invention. Accordingly, other embodiments are within the scope of the following claims.

The invention claimed is:

1. A bracing member mounting assembly for a utility line support system, the bracing member mounting assembly being configured to attach an end of the bracing member to a support member, the bracing member mounting assembly comprising:
a first bracket attachable to the bracing member;
a second bracket attachable to the support member; and
an attachment element that attaches the first and second brackets to each other,
wherein the bracing member mounting assembly is configured to allow a distance between the end of the bracing member adapted to be attached to the utility line support system and the support member to be adjusted along a longitudinal direction of the bracing member.

2. The bracing member mounting assembly of claim 1, wherein the first bracket is pivotable relative to the second bracket.

3. The bracing member mounting assembly of claim 1, wherein the first bracket is not pivotable relative to the second bracket.

4. The bracing member mounting assembly of claim 1, wherein the first bracket has a first coupling element, and the second bracket has a second coupling element, the first and second coupling elements being coupled with each other by the attachment element.

5. The bracing member mounting assembly of claim 1, wherein an orientation of the first bracket is adjustable relative to the second bracket.

6. The bracing member mounting assembly of claim 1, wherein an orientation of the first bracket is not adjustable relative to the second bracket.

7. The bracing member mounting assembly of claim 1, wherein the first bracket comprises a base panel.

8. The bracing member mounting assembly of claim 7, wherein the base panel of the first bracket has a plurality of mounting holes, the base panel being configured to cooperate with a fastening plate such that one of the plurality of the mounting holes of the base panel is aligned with a mounting hole defined in the fastening plate and a mounting hole defined in the end of the bracing member, allowing a first bolt to extend through the aligned mounting holes for attachment of the first bracket to the end of the bracing member, and
wherein a position of the first bracket is adjustable relative to the end of the bracing member by selecting different mounting holes of the base panel to align with the mounting hole defined in the fastening plate and the mounting hole defined in the end of the bracing member.

9. The bracing member mounting assembly of claim 8, wherein the first bracket further comprises first and second opposing side panels each extending toward the fastening plate from a side edge of the base panel.

10. The bracing member mounting assembly of claim 9, wherein the first side panel comprises a plurality of first mounting holes, and the second side panel comprises a plurality of second mounting holes corresponding to the plurality of the first mounting hole, each of the plurality of first mounting holes being paired with a corresponding second mounting hole, one of the plurality of first mounting holes is alignable with the corresponding second mounting hole and a transverse mounting hole defined in the end of the bracing member, allowing a second bolt to extend through the aligned mounting holes, and
Wherein a position of the first bracket is adjustable relative to the end of the bracing member by selecting different pairs of the first and second mounting holes to align with the transverse mounting hole defined in the end of the of the bracing member.

11. The bracing member mounting assembly of claim 9, wherein the fastening plate is integral with the base panel and the side panels.

12. The bracing member mounting assembly of claim 1, wherein the second bracket comprises a plurality of mounting holes such that a position of the second bracket is adjustable relative to the support member by selecting different mounting holes of the second bracket for attachment with the support member.

13. A utility line support system, comprising:
a support member;
a bracing member having an end attached to the support member; and
an adjustable mounting assembly that attaches the end of the bracing member to the support member, the adjustable mounting assembly comprising:
a first bracket attachable to the bracing member;
a second bracket attachable to the support member; and
an attachment element that attaches the first and second brackets to each other,
wherein the adjustable mounting assembly is configured to allow a distance between the end of the bracing member and the support member to be adjusted in a longitudinal direction of the bracing member.

14. A method for adjusting a position of a bracing member relative to a first support member used in a utility line support system by adjusting an adjustable mounting assembly, the adjustable mounting assembly comprising a first bracket, a second bracket and an attachment element that attaches the first and second brackets to each other, the method comprising:
adjusting a position of the first bracket relative to a first attachment end of the bracing member by selecting one of a plurality of mounting holes defined in the first bracket for mounting with the first attachment end of the bracing member;

attaching the first bracket to the first attachment end of the bracing member after aligning the selected mounting hole of the first bracket with a mounting hole defined in the first attachment end of the bracing member;

adjusting an orientation of the first bracket relative to the second bracket by pivoting the first bracket about the attachment element;

adjusting a position of the second bracket relative to the support member after selecting one of a plurality of mounting holes defined in the second bracket for mounting with the support member; and attaching the second bracket to the support member by aligning the selected mounting hole of the second bracket with a mounting hole defined in the support member.

15. The method of claim 14, further comprising attaching a second attachment end of the bracing member to a second support member by another adjustable mounting assembly.

* * * * *

UNITED STATES PATENT AND TRADEMARK OFFICE
CERTIFICATE OF CORRECTION

| | | |
|---|---|---|
| PATENT NO. | : 9,197,051 B2 | Page 1 of 1 |
| APPLICATION NO. | : 14/160902 | |
| DATED | : November 24, 2015 | |
| INVENTOR(S) | : Stenzel et al. | |

It is certified that error appears in the above-identified patent and that said Letters Patent is hereby corrected as shown below:

In the claims,

Column 9, in claim 1, lines 44-46, delete "member adapted to be attached to the utility line support system and the support member to be adjusted along a longitudinal direction of the bracing member." and insert -- member and the support member to be adjusted along a longitudinal direction of the bracing member adapted to be attached to the utility line support system. --.

Column 10, in claim 10, line 30, delete "Wherein" and insert -- wherein --.

Column 10, in claim 10, line 33, after "in the end" delete "of the".

Signed and Sealed this
Twenty-second Day of March, 2016

Michelle K. Lee
*Director of the United States Patent and Trademark Office*